Figure 1:
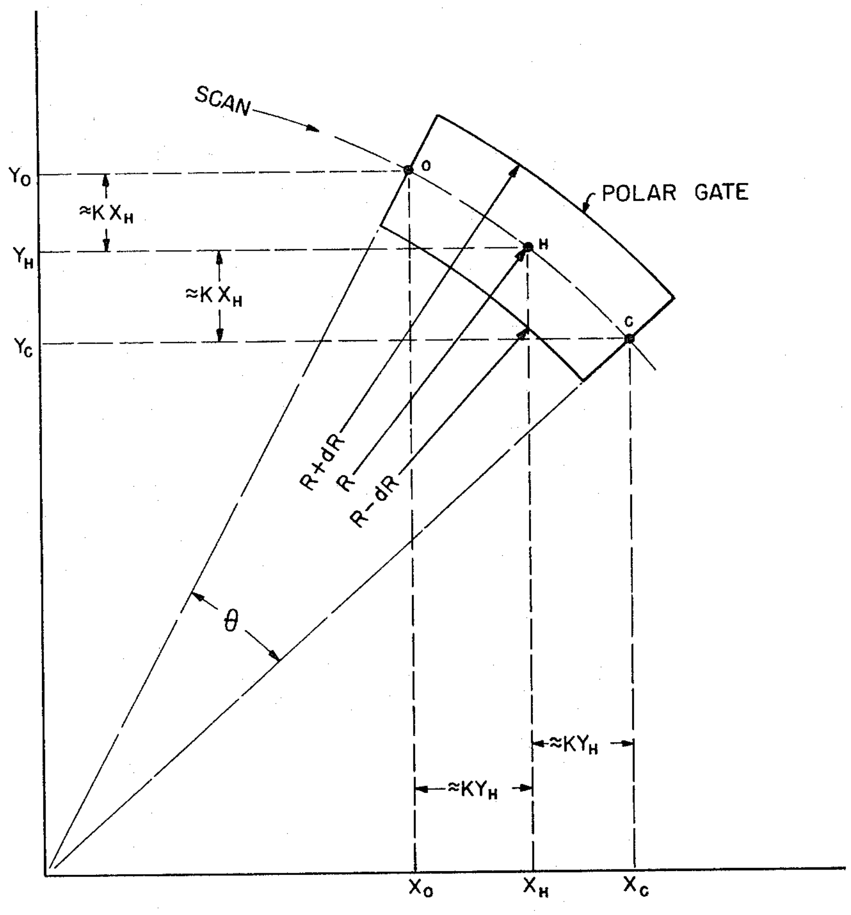

Feb. 14, 1967   F. R. FLUHR ETAL   3,304,550
VIDEO GATE

Filed Sept. 1, 1966   2 Sheets-Sheet 1

INVENTORS
FREDERICK R. FLUHR
GEORGE L. HALL
DONALD J. McLAUGHLIN
BY James D. Murray
ATTORNEYS

VIDEO GATE

Filed Sept. 1, 1966 2 Sheets-Sheet 2

INVENTORS
FREDERICK R. FLUHR
GEORGE L. HALL
DONALD J. McLAUGHLIN
BY James B. Murray
R. S. Sciascia ATTORNEYS

United States Patent Office 3,304,550

Patented Feb. 14, 1967

1

3,304,550

VIDEO GATE

Frederick R. Fluhr, Oxon Hill, and George L. Hall, Camp Springs, Md., and Donald J. McLaughlin, Washington, D.C., assignors to the United States of America as represented by the Secretary of the Navy Filed Sept. 1, 1966, Ser. No. 577,119

9 Claims. (Cl. 343—11)

The invention described herein may be manufactured and used by or for the Government of the United States of America for governmental purposes without the payment of any royalties thereon or therefor.

The present invention relates to a gating circuit and more particularly to a radar and/or IFF video gating circuit which passes return signals from targets within an area of constant angular width and constant range depth.

In the development of PPI type radar and/or IFF interrogation system it has become conventional to concentrate information extraction and data processing operations on targets in a selected geographical area. The center of the selected area is often defined by voltages, sometimes called gate position voltages, which are related to a Cartesian coordinate reference system. However, for practical considerations it is often more convenient to have the geographical area selected defined in polar coordinates, that is, for the area under interrogation to be in the form of constant angular width and constant range depth. Prior circuits for developing a polar, that is, range and bearing, gate centered about a point defined by voltages related to Cartesian coordinates have been both complex and unsatisfactory. In particular, one of the most bothersome of the defects of prior circuits is that the gate provided deviated considerably from the constant angular width and constant range depth form desired.

The general purpose of this invention is to provide a gating circuit which embraces all of the advantages of similarly employed prior radar and/or IFF video gating circuits and which possesses none of the aforedescribed disadvantages and in particular provides a gate which very closely approximates the desired polar form. To attain this result, the present invention provides a unique circuit which alternately adds and subtracts incremental voltages to the Cartesian coordinate related gate position voltages and compares the resultant voltages with the PPI sweep voltages. The opening and closing of the polar gate occurs upon the coincident equivalence of the sweep and resultant voltages. The gate range is controlled by a follow-and-hold circuit that retains the PPI sweep range voltage at the instant the polar gate is opened and causes the range of the polar gate to be centered about the range represented by the retained sweep range voltage.

It is, therefore, an object of the present invention to provide an improved polar gating circuit.

A further object of the invention is the provision of an improved polar gating circuit which produces a gate that is substantially of constant angular width and constant range depth.

Still another object is to provide a circuit which is useful in radar and/or IFF interrogation systems as a video gate that uses Cartesian coordinate related marker voltages to produce and center a polar gate on the marker.

A still further object of the invention is to provide a circuit which is useful in radar and/or IFF interrogation systems as a video gate and adds and subtracts incremental voltages to Cartesian coordinate related marker voltages to produce and center a polar gate on the marker.

Other objects and features of the invention will become apparent to those skilled in the art as the disclosure is made in the following description of a preferred embodiment of the invention as illustrated in the accompanying sheet of drawing in which:

2

Figure 2:
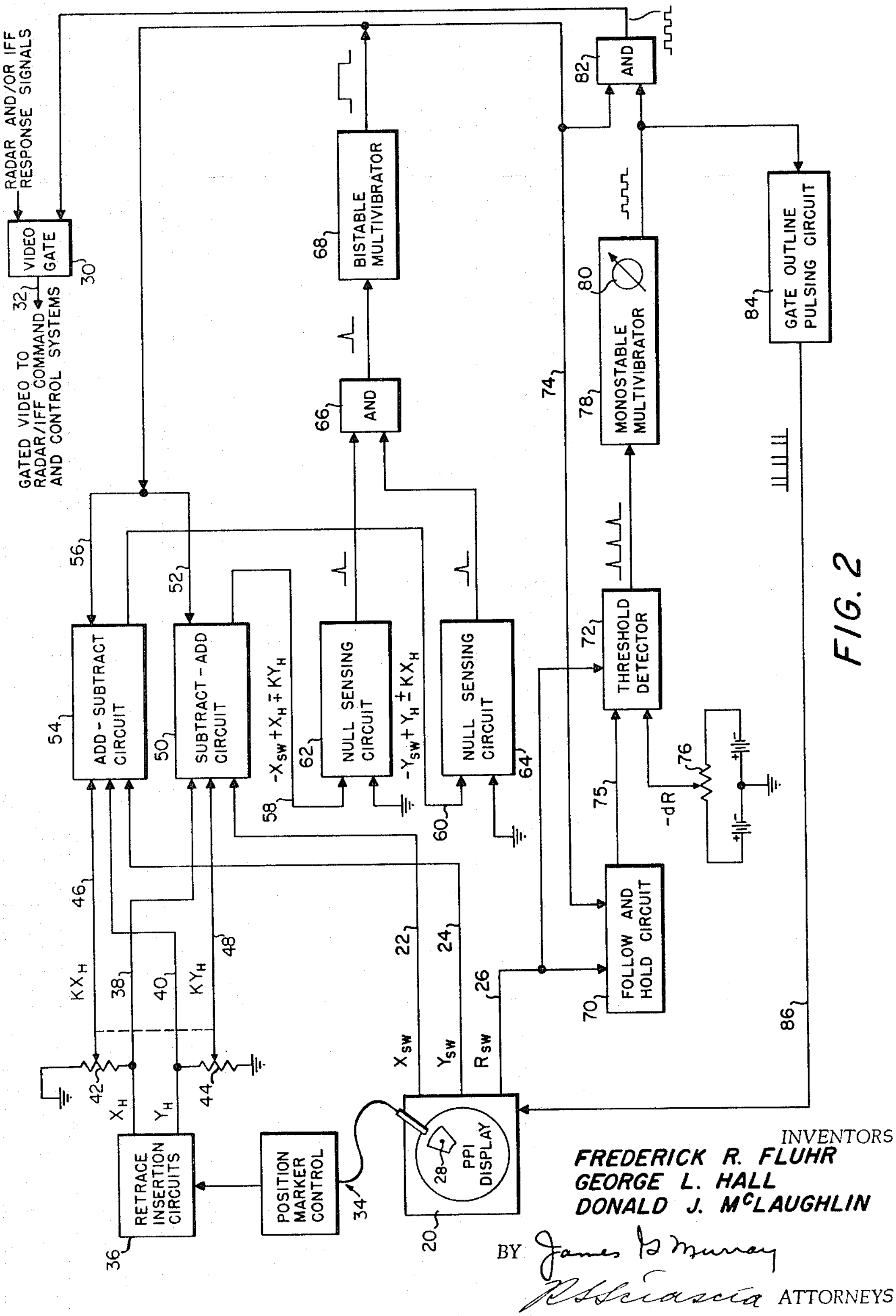

FIG. 1 is a geometric sketch illustrating the theoretical basis for the invention, and FIG. 2 illustrates the invention in diagrammatic form.

Referring first to FIG. 1 of the drawings which contains a sketch that is useful in understanding the theoretical geometric basis of the invention. There is illustrated in FIG. 1 a polar area, or gate, which is defined in range by the bounds $R+dR$ and $R-dR$ and in azimuth by points O (opening) and C (closing), the parenthetic opening and closing referring, of course, to the operation of a clockwise scanned gate. The polar gate illustrated is centered on the point H which is representative of the gate position.

The Cartesian coordinates of the point H are identified as $X_H$ and $Y_H$. It is intuitively evident that the Cartesian coordinates $X_O$, $Y_O$ and $X_C$, $Y_C$ respectively of the points O and C can be approximated by adding and subtracting increments to that gate position coordinates $X_H$ and $Y_H$ as follows:

$$X_O \approx X_H - KY_H$$
$$Y_O \approx Y_H + KX_H$$
$$X_C \approx X_H + KY_H$$
$$Y_C \approx Y_H - KX_H$$

For a polar gate of angle $\theta$, the arc $OC=R\theta$ where $\theta$ is measured in radians.

Particularly for small $\theta$, $R\theta \approx \sqrt{(2KY_H)^2+(2KX_H)^2}$ or $2K\sqrt{X_H^2+Y_H^2}$ Since $R=\sqrt{X_H^2+Y_H^2}$ it is evident that K has the value $K=\theta/2$.

It is here of interest to note that the above approximations are exactly true in the limiting case where $\theta \rightarrow O$ and also that the approximations derived above from an illustration in the first quadrant are equally applicable to the other three quadrants. As shown in Table 1, a polar video gate based upon the above derived approximations deviates less than 1% from a true polar gate for included angles $\theta$ of 8° or less.

TABLE 1

| $\theta$ (degrees): | Range deviation (percent) |
|---|---|
| 0 | 0 |
| 2 | 0.06 |
| 4 | 0.25 |
| 6 | 0.55 |
| 8 | 0.98 |

The tabulated values of range deviation are significantly better than can be attained with prior known circuits which transform Cartesian coordinate related voltages into a polar type gate.

Referring now to FIG. 2, there is shown a PPI repeater 20. As is conventional in fixed deflection coil repeaters, the range sweep voltage $R_{sw}$ is resolved, in synchronism with the rotation of the antenna, into X and Y direction sweep voltages $X_{sw}$ and $Y_{sw}$. These three sweep voltages are connected by leads 22, 24 and 26 to the gating circuit of this invention.

A number of devices, known variously as "joystick," "bowling ball," "electronic pencil" etc. have been developed which position the marker trace 28 on the PPI display while setting the video gate 30 to pass on lead 32 the IFF and/or radar responses only from targets within a geographic area to radar/IFF command and control systems. If presented on the PPI display, these responses would include the marker trace 28. One such device is the light sensitive pencil and position marker control 34 which is further described in copending patent application, Serial No. 525,811, filed February 4, 1966 by Donald J. McLaughlin and Frederick R. Fluhr. These devices, including the pencil and control circuits 34, are used with a retrace insertion circuit 36 to produce D.C. signals $X_H$ and $Y_H$ which are proportional to the position of the marker. These two D.C. voltages are connected by leads 38 and 40 to the gating circuit of this invention and, through respective voltage dividers 42 and 44, to ground. The wipers of voltage dividers 42 and 44 are mechanically adjustable and connected, as illustrated by dashed lines, to set the angular width of the polar video gate and are also electrically connected by leads 46 and 48 to supply D.C. voltage representative of $KX_H$ and $KY_H$ to the gating circuit of the invention. It is apparent that K must have a value less than one.

The leads 22, 38 and 48, which contain the voltages $X_{sw}$, $X_H$ and $KY_H$, are connected to a subtract-add circuit 50 which produces on lead 58 a voltage equal to $-X_{sw}+X_H-KY_H$ when no signal is present on lead 52 and produces a voltage equal to $-X_{sw}+X_H+KY_H$ when a signal is present on lead 52. Similarly leads 24, 40 and 46, which contain the voltages $Y_{sw}$, $Y_H$ and $KX_H$, are connected to an add-subtract circuit 54 which produces on lead 60 a voltage equal to $-Y_{sw}+Y_H+KX_H$ when no signal is present on lead 56 and produces a voltage equal to $-Y_{sw}+Y_H-KX_H$ when a signal is present on lead 56. Circuits 50 and 54 may be one of the many known electrical circuits and devices which either add or subtract under the control of an exterior signal.

It will be apparent that when no signal is present on leads 52 and 56 the voltages on leads 58 and 60 will null at the Cartesian coordinate $X_O$, $Y_O$ which is the opening point O of the polar video gate. Similarly when a signal is present on leads 52 and 56 the voltages on leads 58 and 60 will null at the Cartesian coordinate $X_C$, $Y_C$ which is the closing point C of the polar video gate.

The output of circuit 50 is connected by lead 58 to Null Sensing circuit 62, which is also connected to a reference zero, shown as ground. Similarly, the output of circuit 54 is connected by lead 60 to Null Sensing circuit 64, which is also connected to a reference zero, shown as ground. Circuits 62 and 64 respectively compare the inputs on leads 58 and 60 to the reference zero potential and each circuit produces a pulse when the two inputs to each circuit are equal. The pulse outputs of circuits 62 and 64 are connected to AND gate 66 which produces a pulsed output when the pulsed inputs from circuits 62 and 64 are coincident. The output of AND gate 66 is connected to and triggers a bistable multivibrator 68 which is in turn connected to the input leads 52 and 56 of the circuits 50 and 54.

Range sweep voltage $R_{sw}$ of PPI repeater 20 is connected by lead 26 to a follow and hold circuit 70 which is also connected to receive the output of multivibrator 68 through lead 74. When no signal is present on lead 74, the output signal of circuit 70, on lead 75, follows the input signal $R_{sw}$. When a signal is present on lead 74, the follow and hold circuit output, on lead 75, remains constant at a value R which is equal to the value of $R_{sw}$ at the instant the signal on lead 74 appeared. Threshold detector circuit 72 is connected to reecive the $R_{sw}$ signal on lead 26, the output of circuit 70 on lead 75 and a small, adjustable offset voltage $-d$R from source 76. For as long as a signal is present on lead 74, circuit 72 produces a pulse whenever the value of $R_{sw}$ equals $R-dR$.

The pulsed output of circuit 72 is connected to and triggers monostable multivibrator 78 which produces square wave output pulses, the width of which are adjustable by control 80 to be representative of the value 2 $d$R. It will be, of course, apparent that the adjustable negative input $-d$R and the adjustment 80 respectively control the radial placement and the range depth of the polar video gate.

AND gate 82 is connected to the outputs of bistable multivibrator 68 and monostable multivibrator 78 and, in effect, passes the output of multivibrator 78 as long as a signal is produced by multivibrator 68. The square wave signal output of AND gate 82 is connected to, and opens, the video gate 30, that is, video gate 30 is controlled to pass, by lead 32 to the radar/IFF command and control systems, and if desired to PPI repeater 20, all of the radar and/or IFF response signals which arrive at the video gate 30 during one of the output pulse signals of AND gate 82.

The output of multivibrator 78 is also connected to gate outline pulsing circuit 84 which produces a very short pulse every time multivibrator 78 changes state. The short duration pulses in the output of pulsing circuit 84 are connected by lead 86 to the intensity grid of PPI repeater 20 and causes traces which represent the $R-dR$ and the $R+dR$ arcs to appear on the PPI display.

It will be recognized that the various waveforms shown in FIG. 2 are intended as an aid rather than as an accurate representation; the latter being unattainable because of drafting limitations. For example, it is obvious that circuits 72, 78 and 82 would produce very many more than the three pulses shown during the time circuit 68 is producing a single signal.

The operation of the circuit illustrated in FIG. 2 is probably by now apparent. Initially there is no signal in leads 52 and 56 and video gate 30 is closed. Null Sensing circuits 62 and 64 produce non-coincident pulses as the signals on leads 58 and 60 null. Eventually the clockwise sweeping of PPI repeater 20 includes point O (the opening point of the desired polar video gate) at which time the pulses from circuits 62 and 64 are coincident. When this occurs, the multivibrator 68 is triggered to produce a signal. The presence of this signal on lead 74 causes circuit 70 to hold the value R, that is the value of the sweep voltage $R_{sw}$ at the instant the signal appears on lead 74. Circuit 72 compares the value of the $R-dR$ and $R_{sw}$ input signals during the time interval when a signal appears on lead 74 and produces a pulse signal when the range sweep $R_{sw}$ equals the value $R-dR$. This pulse triggers multivibrator 78 which produces a square wave, the width of which is adjusted by control 80 to be representative of 2 $d$R. These square waves are passed by AND gate 82 and open the video gate 30. The square waves of multivibrator 78 also energize pulsing circuit 84 which is connected to PPI repeater 20 to cause arc traces representative of the $R-dR$ and $R+dR$ boundary to the video polar gate.

The output signal of mutivibrator 68 also places a signal on leads 52 and 56 whereupon circuits 50 and 54 provide D.C. and X and Y sweep voltages which have been additively and subtractively combined in such a way that the Cartesian coordinates $X_C$ and $Y_C$ of the closing point C of the polar gate are derived by circuits 62 and 64. When simultaneous nulls are sensed by circuits 62 and 64 the multivibrator 68 is triggered, causing the termination of the output signal of multivibrator 68. Termination of the multivibrator 68 signal restores the circuit to its original condition by removing the signal from leads 52 and 56, thereby causing circuits 50, 54, 62 and 64 to again produce signals representative of the Cartesian coordinates $X_O$ and $Y_O$ of the opening point O of the polar gate and by deenergizing circuit 70 and by closing AND gate 82.

It will be apparent that there has been disclosed a circuit which is useful in PPI type display systems as a video gate and which adds and subtracts incremental voltages to Cartesian coordinate related marker voltages to produce and center a polar gate on the marker.

Obviously many modifications and variations of the present invention are possible in the light of the above teachings. For example, a designer might wish to add buffer circuits to isolate certain components in the illustrated circuit of FIG. 2 or might wish to add a circuit, such as a monostable multivibrator in a feedback loop around bistable multivibrator 68, to insure that the polar gate would not be prematurely closed by an extraneous noise signal.

It is also obvious that the designer will of necessity adapt the disclosed invention to suit the particular requirements of the associated PPI display system. NRL Report 6372, U.S. Naval Research Laboratory, Washington, D.C. contains specific circuits which were used in adapting the disclosed invention for use with the AN/SPA–8A PPI repeater.

It is, therefore, to be understood, that within the scope of the appended claims, the invention may be practiced otherwise than as specifically described.

What is claimed and desired to be secured by Letters Patent of the United States is:

1. In a PPI display system which produces range, horizontal and vertical sweep signals $R_{sw}$, $X_{sw}$ and $Y_{sw}$ and D.C. marker signals $X_H$ and $Y_H$, which represent the co-ordinates of a selected position of the display, a circuit for producing a polar gate which is substantially of constant angular width and substantially of constant range depth comprising:

signal producing means connected to receive said horizontal and vertical sweep signals $X_{sw}$ and $Y_{sw}$ and said D.C. marker signals $X_H$ and $Y_H$ and having two controllable conditions; said signal producing means producing signals equal to $-X_{sw}+X_H-KY_H$ and $-Y_{sw}+Y_H+KX_H$ in one of said two conditions and producing signals equal to $-X_{sw}+X_H+KY_H$ and $-Y_{sw}+Y_H-KX_H$ in the other of said two conditions, where K is less than one;

comparing means connected to receive and to compare the signals produced by said signal producing means with a reference signal and to produce a signal when the signals produced by said signal producing means equal said reference signal;

a square wave pulse producing circuit connected to be energized and to receive said range sweep signal $R_{sw}$ for repetitively producing, when energized, a square wave pulse each time said range sweep signal $R_{sw}$ equals a value less by an increment $d$R than said range sweep signal was at the time said square wave pulse producing circuit was energized; and a bistable multivibrator having an input connected to said comparing means, said bistable multivibrator changing state in response to each of said signals produced by said comparing means, the output of said bistable multivibrator being connected to control the condition of said signal producing means and to energize said square wave pulse producing means;

whereby the square wave pulses produced by said square wave pulse producing means define a polar gate in said PPI display system.

2. A circuit as set forth in claim 1 and further including adjustment means for varying the value of K and thereby varying the angular width of said polar gate.

3. A circuit as set forth in claim 1 and further including adjustment means for varying the duration of said square wave pulses and thereby varying the range depth of said polar gate.

4. A circuit as set forth in claim 1 wherein said square wave pulse producing circuit comprises:

a follow and hold circuit having a lead for energization by said bistable multivibrator and being also connected to receive said range sweep signal $R_{sw}$, said follow and hold circuit producing a signal R equal to the value of said range sweep signal $R_{sw}$ at the instant of energization;

an adjustable source of potential for producing a signal $-d$R;

threshold detector circuit means connected to said follow and hold circuit and to receive said $-d$R and $R_{sw}$ signals and to produce a pulse when $R_{sw}=R-dR$ and a monostable multivibrator connected to said threshold detector circuit means and having an adjustment for varying the duration of the pulses produced by said monostable multivibrator;

whereby adjustment of said $-d$R signal varies the radial position of said polar gate and adjustment of the duration of the pulse produced by said monostable multivibrator varies the range depth of said polar gate.

5. A circuit as set forth in claim 4 and further including adjustment means for varying the value of K and thereby varying the angular width of said polar gate.

6. A circuit as set forth in claim 1 wherein said comparing means includes two null sensing circuits, one of said two null sensing circuits being connected to receive the $-X_{sw}+X_H\mp KY_H$ signals and to produce a pulse when these signals are nulled, the other of said two null sensing circuits being connected to receive the $-Y_{sw}+Y_H\pm KX_H$ signals and to produce a pulse when these signals are nulled, and an AND gate connected to the output of said two null sensing circuits.

7. A circuit as set forth in claim 6 and further including adjustment means for varying the value of K and thereby varying the angular width of said polar gate and for varying the duration of said square wave pulses and thereby varying the range depth of said polar gate.

8. A circuit as set forth in claim 6 wherein said square wave pulse producing circuit comprises:

a follow and hold circuit having a lead for energization by said bistable multivibrator and being also connected to receive said range sweep signal $R_{sw}$, said follow and hold circuit producing a signal R equal to the value of said range sweep signal $R_{sw}$ at the instant of energization;

an adjustable source of potential for producing a signal $-d$R;

threshold detector circuit means connected to said follow and hold circuit and to receive said $-d$R and $R_{sw}$ signals and to produce a pulse when $R_{sw}=R-dR$ and a monostable multivibrator connected to said threshold detector circuit means and having an adjustment for varying the duration of the pulses produced by said monostable multivibrator;

whereby adjustment of said $-d$R signal varies the radial position of said polar gate and adjustment of the duration of the pulse produced by said monostable multivibrator varies the range depth of said polar gate.

9. A circuit as set forth in claim 8 and further including adjustment means for varying the value of K and thereby varying the angular width of said polar gate.

References Cited by the Examiner

UNITED STATES PATENTS

| | | | |
|---|---|---|---|
| 2,991,464 | 7/1961 | Greenfield | 343—11 X |
| 3,188,631 | 6/1965 | Birtley | 343—11 X |

RODNEY D. BENNETT, *Acting Primary Examiner.*

D. C. KAUFMAN, *Assistant Examiner.*